Oct. 24, 1967    H. E. DIJKMEIJER    3,348,297
METHOD OF MANUFACTURING A MOUNT FOR A SEMI-CONDUCTOR DEVICE
Filed June 3, 1965

INVENTOR.
HENRICUS E. DIJKMEIJER
BY
Frank R. Trifari
AGENT

United States Patent Office 3,348,297
Patented Oct. 24, 1967

3,348,297
METHOD OF MANUFACTURING A MOUNT FOR A SEMI-CONDUCTOR DEVICE
Henricus Emanuel Dijkmeijer, Mollenhutseweg, Nijmegen, Netherlands, assignor to North American Philips Company, Inc., New York, N.Y., a corporation of Delaware
Filed June 3, 1965, Ser. No. 460,982
Claims priority, application Netherlands, June 20, 1964, 64—7,071
2 Claims. (Cl. 29—480)

My invention relates to a method of manufacturing a mount of an envelope intended for a semi-conductor device.

In a known method a metal welding ring is soldered to one of the two sides of a metal blank. The blank and the welding ring are then disposed in a molding press, in which the material of the blank is caused to assume such an annealing temperature that its hardness increases and a stem is formed on the other side of the blank, while at least part of the material lying beneath the welding ring is displaced in a direction transverse of the pressing direction.

This known method is particularly intended for the formation of the copper mount of controllable or ordinary power rectifiers, which must be provided with a welding ring to permit securing, for example by electric resistance welding, a hood to the mount. To this end the welding ring must consist of a metal having a higher resistivity than copper, for example of iron, steel and ferrochromium.

These methods are not confined to the manufacture of copper mounts. In principle they may be used for mounts of any material that becomes mechanically stronger by deformation and loses this rigidity at soldering temperatures. Such materials are therefore understood to be included where hereinafter reference is made to copper only.

Since in the method described above the welding ring is soldered to the mount prior to the deformation in the molding press, this method will be termed hereinafter simply "molding pressing." The material of the mount may be given a greater mechanical rigidity than in the known method in which a mount molded in the press is provided with a welding ring by soldering, since a satisfactory soldering joint requires such a high temperature that the copper of the mount is softened. The term "soldering" is therefore to be understood to denote herein any method of fusing together the welding ring and the blank including the method of brazing which involves the application of temperatures at least as high as that at which the hardened copper loses its rigidity. This latter temperature is usually about 400° C.

The stem formed on the side of the blank remote from the welding ring usually is provided with screwthread and which is screwed into a heat exchanger. The momentum required is transferred to the mount by means of a usually hexagonal profiled rim, the diameter of which is at least locally greater than that of the welding ring. During the molding process, therefore, material must be displaced outwardly at least locally beneath the welding ring in a radial direction transverse to the pressing direction. In the case of a hexagon this displacement of material is greatest at the corners.

It is sometimes necessary to form an elevated part, i.e. a so-called platform inside the welding ring on the mount. In this case material can flow from the edge of the blank towards the center.

This may give rise to various disadvantages. The soldering joint between the welding ring and the copper has to meet severe requirements in order to avoid cracks and leaks in the material. Moreover, the welding ring itself may be carried along with the material and may assume a substantially hexagonal shape. If the welding ring is provided with the conventional upright rim, the so-called welding rim, this rim may be locally slipped off the ring, so that the weld to be formed will exhibit weak points.

Even if the welding ring were soldered to a blank previously formed to a hexagon, so that the displacement of material would be reduced, such displacements could not be completely avoided. Moreover, this method would require an additional processing.

It is a principal object of my invention to provide a method of manufacturing mounts for semi-conductor devices which does not have these drawbacks.

A further object of my invention is to provide a method of manufacturing mounts for semi-conductor devices in which displacement of material particularly in a direction transverse of the pressing direction is avoided in a region located directly beneath the welding ring so that the soldering joint remains at least partly in a state of rest.

These and further objects of the invention will appear as the specification progresses.

According to the invention the welding ring is soldered to a blank which has at least one rim of the same diameter as one of the edges of the welding ring. The assembly then is put into a molding press having a chamber which bears on at least two corresponding rims sideways over a height equal to the thickness of the welding ring at that place plus at least 0.1 mm. The blank then is molded by pressure to a mount so that the soldering joint remains stationary beneath the aforesaid supported edge of the welding ring over a height of at least 0.1 mm.

The welding ring is preferably soldered to a blank of the same outer diameter as the welding ring, the mount being then pressed in a mold having a hexagon, which circumscribes the welding ring or exceeds the outer periphery thereof.

The invention will now be described more fully with reference to the accompanying drawing in which.

Figure 1:
FIG. 1 is a vertical sectional view and FIG. 2 is a plan view of a blank with a welding ring soldered thereon made in accordance with the prior art method.
Figure 2:
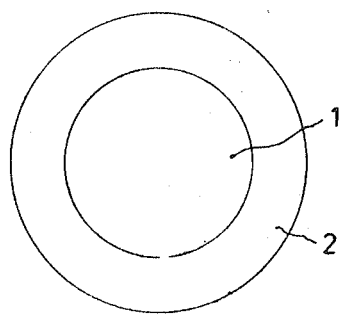

The blank 1 of FIGS. 1 and 2 is formed, for example by a round, copper disc of a diameter of about 25 mm., to which an iron welding ring 2 is soldered using a hard solder, for example an alloy of copper and silver. The layer of solder, which is usually very thin is not shown in the drawing. The mount made from this blank by pressing (see FIGS. 3 and 4) has a stem 3 (shown in part). By suitable formation the welding ring 2 is provided with a welding rim 4. The edge of the mount is formed into a hexagon 5 in order that after providing the stem 3 with screwthread and after the semi-conductor device is finished the mount can be secured in a heat exchanger or a cooling plate. The direction of pressing shown in this figure is vertical.

Figure 3:
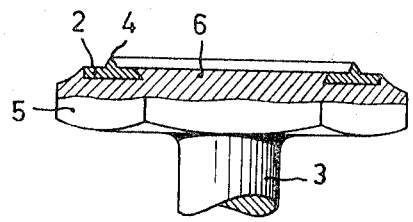
FIG. 3 is a side elevation of a mount obtained by pressing a blank with a welding ring, partly shown in a vertical sectional view
Figure 4:
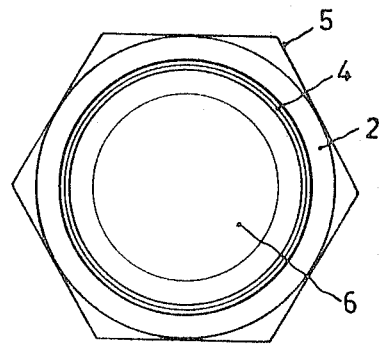
FIG. 4 is a plan view of said mount.

From FIG. 3 it will be apparent that displacement of material has taken place during the formation of the mount beneath the welding ring 2 in a horizontal direction and hence transversely to the pressing direction. This displacement of material appeared firstly below the outer edge of the welding ring 2 for the formation of the hexagon 5 and secondly below the inner edge of the welding ring 2 for the formation of a platform 6, which fills out the space inside the mount.

The blank of FIG. 5 has the same shape as that of FIG. 1, but the molding press used in this case (only the upper part 10 is shown diagrammatically) has a chamber 11, the sidewall 12 of which supports the outer edge of the welding ring 2 and part of the outer edge of the blank 1 so that after the pressing operation the material of the blank 1 and that of the soldering joint located directly below the outer edge of the welding ring remains in a state of rest during the molding process. The region of this material is indicated in FIG. 6 by the arrow 14. The risk of voids in the soldering joint is therefore very small at this place. Along the inner edge of the welding ring 2 in the region indicated by the arrow 15 a certain degree of displacement of material occurs, but it will not cause leaks in the region 14.

Figure 7:
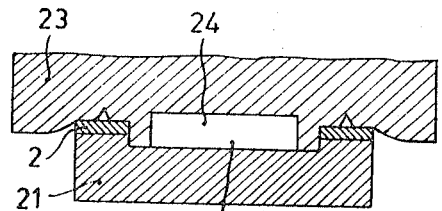

The blank 21 of FIG. 7 has, on the upper side, a depression 22, the inner diameter of which is equal to that of the welding ring 2. The part 23 of the molding press (shown diagrammatically) has a chamber accommodating the welding ring 2, the chamber supporting the inner edge of the ring and the side wall of the depression. At the center of the press 23 there is provided a depression 24, the diameter of which is smaller than that of the depression 22. The mount shown in FIG. 8, has, on the upper side, a platform 25 which is surrounded by a groove 26. Below the inner edge of the welding ring 2 of this mount there is a region, indicated by the arrow 27, where the material of the blank and of the soldering joint remain in the state of rest. Displacement of material occurs at the outer edge of the welding ring in the region indicated by the arrow 28.

Figure 5:
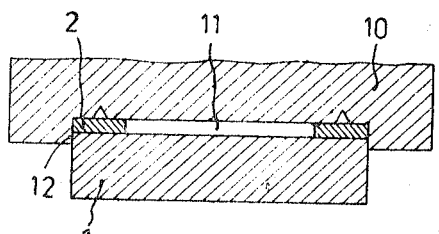
FIGS. 5 and 7 are vertical sectional views of a blank with a welding ring made in accordance with the invention; part of a molding press is shown diagrammatically.
Figure 6:
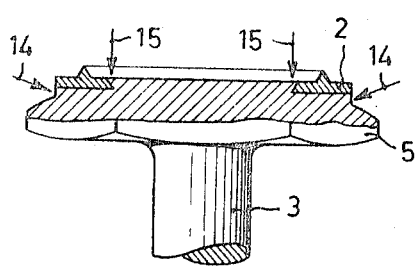
FIGS. 6 and 8 are side elevations of mounts, which are shown partly in sectional views and which are manufactured from the blanks shown in FIGS. 5 and 7 respectively.
Figure 8:
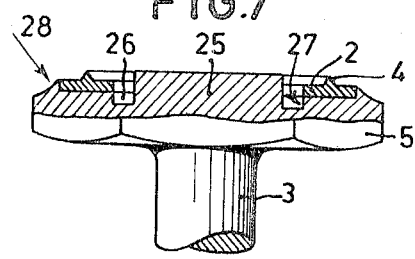

As a matter of course, the measures illustrated in FIGS. 5 and 6 and in FIGS. 7 and 8 respectively may be combined with each other or with other forms.

The thickness of the region of material of the soldering joint and the blank to be kept in rest may be determined empirically. If very strong solder is used, this region may be thinner than in the case of less strong solder. The invention permits the use of simple soldering joints, if a region of adequate dimensions in the mount material is kept in rest.

With this method it is for example possible to provide the blank and the welding ring with a nickel coating and to solder them to each other by means of said coating.

While I have described the invention in connection with a specific embodiment thereof, other modifications will be apparent to those skilled in this art without departing from the spirit and scope thereof as defined in the appended claims.

What is claimed is:
1. A method of producing a mount for an envelope of a semi-conductor device, comprising the steps of soldering a metal welding ring to one of two sides of a metal blank having at least one rim of a diameter equal to that of one of the edges of the welding ring, disposing the blank with the welding ring in a molding press having a chamber bearing laterally on at least two corresponding rims over a height equal to the local thickness of the welding ring plus at least 0.1 mm., annealing the material of the blank while in the press so that its hardness increases and a stem is formed on the other side of the blank, and applying a pressure in a given direction to form the blank into the mount, the soldering joint remaining in a state of rest underneath the said supported edge of the welding ring over a height of at least 0.1 mm. and at least part of the material underneath the welding ring being displaced in a direction transverse to the direction of pressing.

2. A method as claimed in claim 1, in which the welding ring is soldered to a blank having the same diameter as the welding ring, the bottom of the blank being then pressed in a mold having a hexagonal shape, which fits around the welding ring and has dimensions at least equal to those of the welding ring.

References Cited

UNITED STATES PATENTS 3,197,843   8/1965   Nippert _____ 29—581

WILLIAM I. BROOKS, *Primary Examiner.*